Sept. 9, 1969          E. M. USAB          3,465,528

FLOATING WAVE SUPPRESSOR

Filed April 25, 1967          3 Sheets-Sheet 1

INVENTOR.
ERNEST M. USAB

BY FOWLER, KNOBBE & MARTENS
ATTORNEYS.

Sept. 9, 1969        E. M. USAB        3,465,528
FLOATING WAVE SUPPRESSOR
Filed April 25, 1967        3 Sheets-Sheet 2
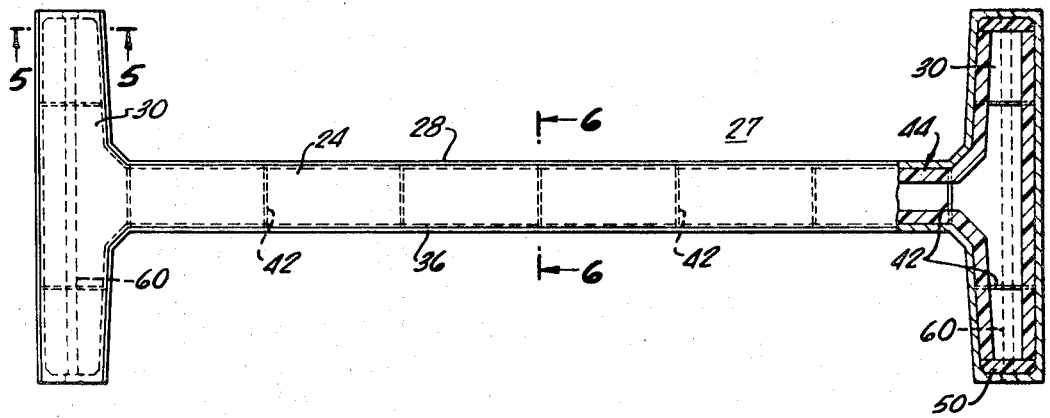
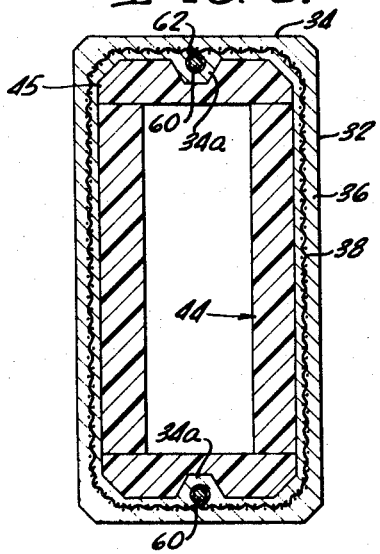 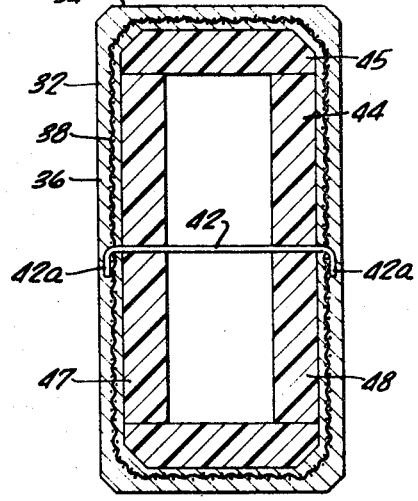
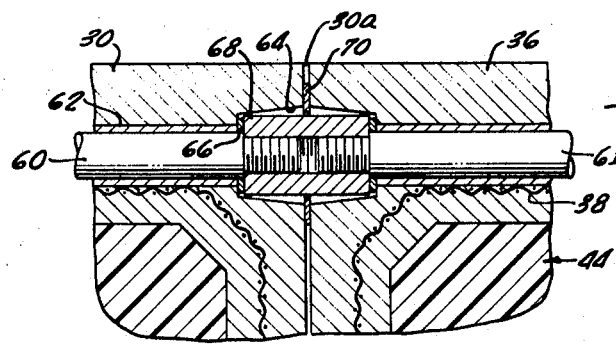
INVENTOR.
ERNEST M. USAB
BY FOWLER, KNOBBE
& MARTENS
       ATTORNEYS.

Sept. 9, 1969   E. M. USAB   3,465,528
FLOATING WAVE SUPPRESSOR
Filed April 25, 1967   3 Sheets-Sheet 3
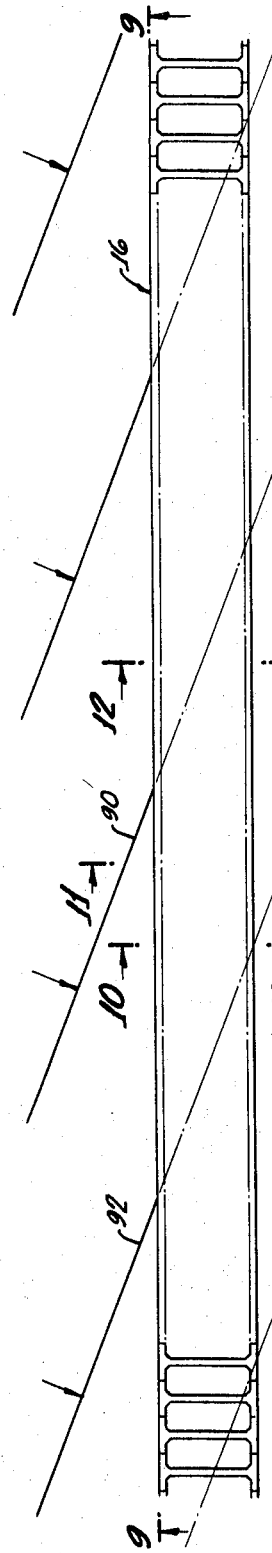
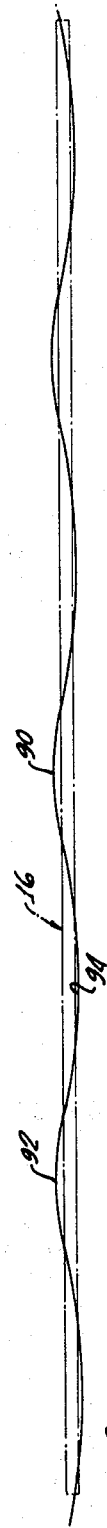
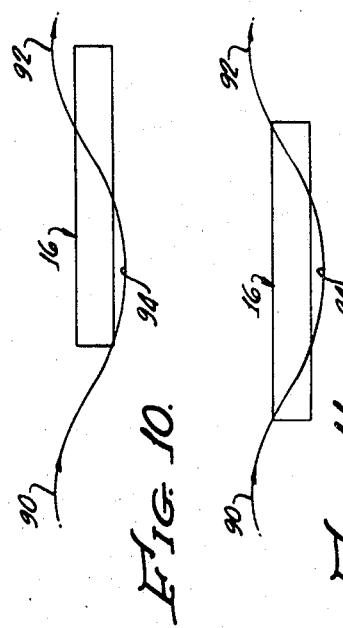
INVENTOR.
ERNEST M. USAB
BY
FOWLER, KNOBBE
& MARTENS
ATTORNEYS.

United States Patent Office 3,465,528
Patented Sept. 9, 1969

3,465,528
FLOATING WAVE SUPPRESSOR
Ernest M. Usab, Costa Mesa, Calif.
(1229 E. Wakeham Ave., Santa Ana, Calif. 92705)
Filed Apr. 25, 1967, Ser. No. 633,633
Int. Cl. E02b 3/04
U.S. Cl. 61—5                                                9 Claims

ABSTRACT OF THE DISCLOSURE

A massive pair of spaced longitudinal members extending for a considerable distance are rigidly connected by a plurality of lateral members. Formed from modules joined by tension members, the longitudinal and lateral members have a concrete exterior shell surrounding a lightweight core so that the structure floats on water to suppress waves.

BACKGROUND OF THE INVENTION

This invention relates to an improved method and structure for suppressing waves on large bodies of water and to a method for making the novel wave suppressing structure. The invention further relates to a low cost marina utilizing such suppressors and floating docks or wharves.

In the use of yachts, sailboats and other small water craft, it is essential that the docking facilities employed be adequately sheltered to protect the craft from destructive wave action. There is, of course, a very limited number of coves, harbors, or other naturally formed adequately sheltered areas for such docking facilities. Hence, in view of the ever-increasing boating activity, a great need exists for improved means to provide man-made arrangements for this purpose.

Perhaps the most common approach currently used for protecting such shore facilities is to construct a breakwater or barrier to destroy the waves. Some such breakwaters are formed by driving rows of large pilings into the water bottom and confining rocks, concrete, or similar heavy material between them. Other breakwaters are formed by accumulating large quantities of rock or concrete to make a massive wall, which often forms an extension from the shore.

A major difficulty with these breakwaters is the cost of construction. Pile driving is an expensive operation and properly treated pilings are a substantial cost item. Although the materials for rock breakwaters are normally inexpensive, they are not always conveniently available in the location needed. Hence, transportation costs are frequently a major factor. Also, enormous quantities of the materials are needed since the breakwater typically extends upward from a very broad base. Thus, it can be appreciated that the expense is often prohibitive, particularly for private commercial operations; and hence a great need exists for an economical approach for accomplishing this function.

Another substantial cost of a marina is that of adequate wharfs or docks. In recent years, inexpensive but well constructed floating concrete wharfs have been developed which have helped the development of boating facilities. However, since the areas generally require protection from waves, the use of such floating structures has been restricted by the cost of conventional breakwaters.

SUMMARY OF THE INVENTION

The wave suppressor of this invention comprises a massive pair of widely spaced, parallel, longitudinal members extending in length a substantial distance. A plurality of inner members rigidly connect the longitudinal members and define compartments between the members open at the top and bottom. The construction of these members includes a concrete exterior shell and a lightweight core so that the suppressor floats on water with a substantial portion of the members extending above the water. Preferably, the outer longitudinal members are spaced further than one-half of a wave length, or peak to peak distance, of the waves to be suppressed but less than the entire wave length.

Thus, to suppress the waves at a certain location in a particular body of water, the average wave length for destructive type waves in that area is determined and the suppressor is constructed accordingly. By placing the wave suppressor between the area to be sheltered and the incoming waves, and anchoring the suppressor at this location in a manner to accommodate changes in water depth, the incoming waves strike the longitudinal members of the suppressor in successive fashion and are tripped or spoiled.

In its preferred form, the suppressor is constructed of a plurality of generally I-shaped modules with the outer sections of the modules forming the longitudinal members of the suppressor when the modules are arranged in side-by-side relation. They are connected in this position by suitable elongated members which provide the necessary tensile strength to the structure, which with the high compressive strength of the concrete forms an extremely rugged, but low cost, construction. Advantageously, the modular approach permits manufacture at a location remote from the point of use, in that the modules are dimensioned to permit movement on normal rail and highway facilities. Also, since the suppressor floats, it can if desirable be towed in water.

BRIEF DESCRIPTION OF THE DRAWINGS

FIG. 4 is a plan partially cutaway view of one module of the suppressor;

FIG. 5 is a cross-sectional view of the module taken generally on line 5—5 of FIG. 4;

FIG. 6 is a cross-sectional view taken generally on line 6—6 of FIG. 4;

FIG. 7 is an enlarged cross-sectional view of a connection between two of the modules of FIG. 4;

FIG. 8 is a diagrammatic plan view of a suppressor in the water;

FIG. 9 is a diagrammatic elevational view of the suppressor on line 9—9 of FIG. 8; and FIGS. 10–12 are end elevational views of the suppressor of FIG. 8 along the lines 10—10, 11—11, and 12—12 respectively.

DESCRIPTION OF THE PREFERRED EMBODIMENT

Figures 1, 2, 3:
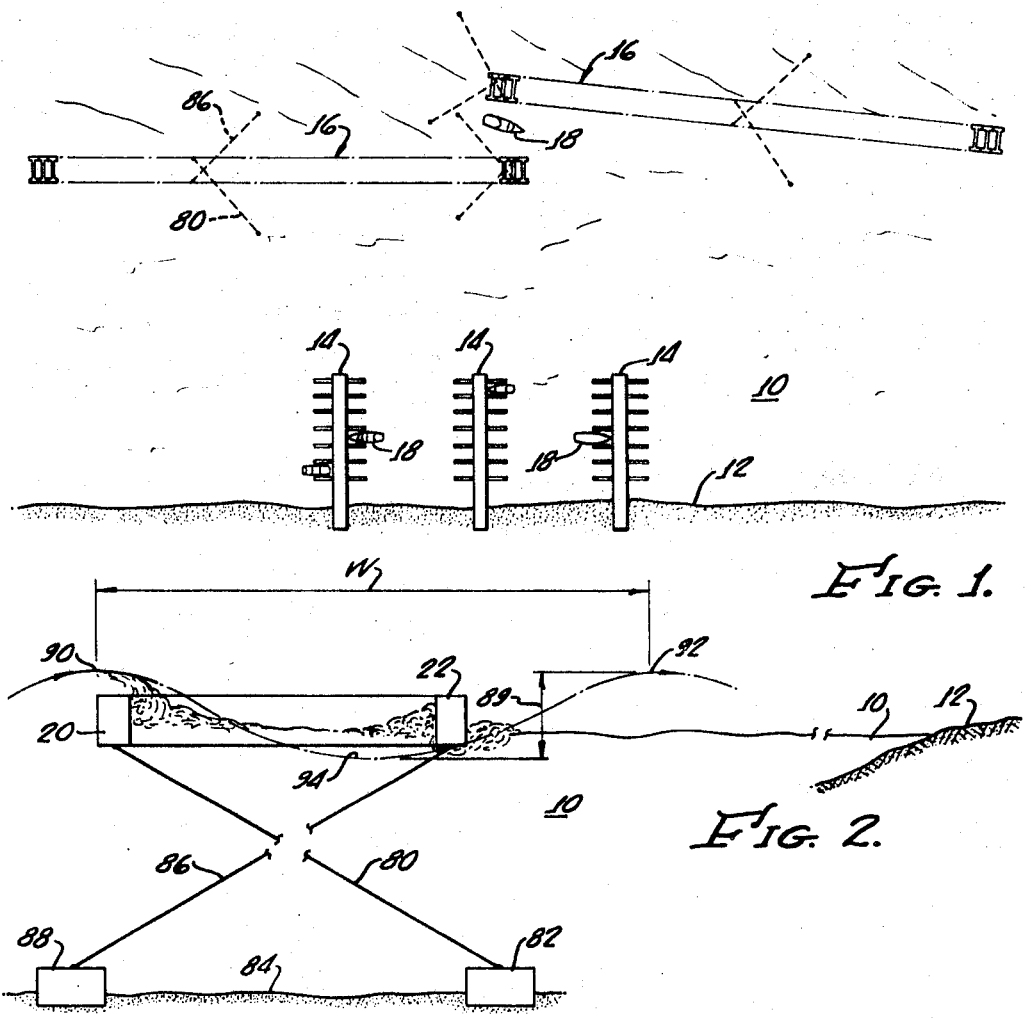
FIG. 1 is a schematic illustration of a docking facility employing the wave suppressor of this invention.
FIG. 2 is an end elevational view of the suppressor in use.
FIG. 3 is a perspective view of a portion of the wave suppressor.

To obtain a general understanding of the invention, refer first to FIG. 1, wherein there is illustrated a schematic arrangement of a harbor or marina including a body of water 10 adjacent to the shore 12 with a plurality of piers or wharfs 14 extending outwardly from the shore. The wharfs 14 preferably have a floatable hollow, concrete construction of the type described in U.S. Patents 3,091,203 and Reissue 24,837 to this invention. Such wharfs are quite rugged and relatively economical. The availability of low cost wave suppression means encourages use of these wharfs since suppression is often required to protect the boats 18 docked there in heavy wave condition.

Two of the floating wave suppressors 16 of the invention are illustrated spaced from the shore to protect the wharfs 14 from the incoming waves. The wave suppressors are elongated structures which extend in length from usually no less than 100 to usually no more than 1,000 feet. The number of units needed may be grouped in a manner to enclose the area from destructive wave action. The wave suppressors are anchored to the water bottom in a manner to be subsequently described in detail. As can be seen, the adjacent ends 15 and 17 of the two suppressors overlap slightly and are spaced sufficiently to permit a boat 19 to enter the sheltered area on its way to the wharfs 14.

Referring now to the rest of the drawings, and particularly to FIGS. 3-6, the wave suppressor 16 may be seen to be a massive structure having a pair of outer, spaced, parallel, upstanding, longitudinal members 20 and 22, which as mentioned, extend in length for a substantial distance. The outer members are connected by a plurality of spaced inner lateral members 24 which define a plurality of spaces 26 between the members. The suppressor is preferably formed of large identical monolithic modules 27 (FIG. 4) having generally an I-shape. As seen in FIG. 3, the modules are arranged in side-by-side relation with the outer sections 30 being aligned to form the suppressor outer members 20 and 22, and the center section 28 of a module forming an inner member 24 of the suppressor.

The modules may be fabricated in the sizes desired; however, it is preferable that the length of the center section 28 bear a certain relationship with the peak to peak distance or wave length 31 of the waves to be suppressed as schematically shown in FIG. 2. More specifically, the center section of the modules should be dimensioned so that the outer members of the suppressor are spaced more than one-half of wave length W but less than the entire wave length.

The suppressor described herein is particularly useful in inland water bodies or partially sheltered ocean areas wherein the waves are such that the longitudinal members should be spaced from about 15 to 40 feet. For most applications the spacing, and hence the center sections of the modules, will be between about 20 and 30 feet.

The length of the outer sections 30 of each suppressor module is preferably approximately eight feet so that the modules may be conveniently shipped by normal highway or rail transportation while yet the individual modules are of significant size to reduce assembly steps.

Referring to FIGS. 5 and 6, a preferred example of an appropriate cross section of the suppressor members is approximately the same for the center section and the outer section of a module. The rectangular cross section includes a vertical wall 32 of approximately 3 feet and a horizontal wall 34 of approximately 18 inches. Such shape provides substantial volume for interrupting and displacing water and is very rugged. The cross section includes an outer concrete shell 36 having a thickness of about one and three-quarters inches, which is reinforced by wire mesh 38 spaced approximately one inch from the exterior surface. The concrete preferably should be of the type having a relatively high strength and low weight which is suitable for use in water. One example of such concrete has a minimum compressive strength of approximately 3,600 pounds per square inch after 28 days' curing, and a maximum density of about 110 pounds per cubic foot. A suitable wire mesh 38 has a six inch square and is made of ten gauge galvanized iron.

To reinforce the structure further, there are provided a plurality of steel elements 42 spaced throughout the module structure approximately every three feet, as seen in FIGS. 4 and 6. The main portion of the elements 42 extends across the modules between the side walls 32 with the transversely extending ends 42a being embedded in the concrete shell 36.

The outer concrete shell 36 surrounds a lightweight core 44 preferably formed as a hollow waterproof box, although a solid mass of lightweight material is also suitable. As illustrated in FIGS. 5 and 6, the box 44 is formed of upper and lower walls 45 and 46 and side walls 47 and 48. The box is completed by end walls 50 one of which is shown in FIG. 4. The walls of the box 44 are from three to four inches thick and made of a suitable rigid, lightweight material which is impervious to water, such as polystyrene foam, more commonly known by the trademark, Styrofoam. Such material has a density of approximately 1.5 pounds per cubic foot. With such concrete and polystyrene foam construction, the overall density of the suppressor is approximately one-half that of water so that the suppressor floats in water with approximately one-half of the unit above the water surface, or in other words, with a freeboard of approximately 18 inches for a three foot suppressor. The proportion of polystyrene foam and concrete should be such that if the box 44 should leak, the structure will still not sink.

Concrete, as is well known, has extremely high compressive strength, but has a relatively low tensile strength. Due to the length of the suppressor, the outer longitudinal members are subjected to substantial bending moments which introduce tensile stresses as well as compressive stresses. Consequently, to accommodate these tensile stresses, and at the same time suitably connect the individual modules, there are provided a plurality of elongated metal rods 60 having for example a diameter of about one inch. As can be seen from FIGS. 4, 5 and 7, the metal rods 60 extend through metal pipes 62 embedded in inwardly extending enlarged portions 34a formed in the upper and lower walls 34 of the concrete shell 36. As seen in FIG. 5, the enlarged portions 34a extend inwardly into recesses in the upper and lower walls 45 and 46 of the foam box 44. The metal pipes 62 have an internal diameter of approximately one inch. The pipe ends terminate spaced inwardly from the end face 30a of the module section 30, as viewed in FIG. 7, near the bottom of a socket 64 formed in the module and face 30a.

A flat washer 66 surrounding the rod 60 is positioned at the bottom of the socket 64 in contact with the end of the pipe 62. The outer ends 60a of each rod 60 are threaded to receive an elongated tension nut 68, which fits within the socket 64. A flat gasket 70 surrounds the tension nut 68 and extends between the opposing end faces 30a of adjacent modules. The gasket is preferably made of a strong but slightly resilient material such as reinforced neoprene which suitably distributes the compressive forces into the modules so that greater stress may be applied by the tension rods 60. The gasket also provides resiliency for physical shock; provides some tolerance for variations of the rod lengths due to thermal expansion and contraction; and seals the metal elements from open communication with the water.

In assembly, the modules are floated into position in the water and the tension rods suitably connected by threading a nut 68 onto the end of one rod 60 and then threading an end of another rod 61 into the other end of the tension nut. To enhance the strength of the construction, it is desirable to put an extremely high tensile force on the rods and thus compressive force on the concrete. In practice, it is recommended that approximately 70,000 pounds of tension be applied to the rods. Such a prestressed arrangement provides an extremely strong construction, the rods together with the module outer sections effectively acting as a truss.

In use, it is necessary that the wave suppressor be anchored at periodic intervals along the length of the suppressor. For this purpose, there is illustrated in FIG. 2 an anchor line or cable 80, preferably made of plastic materials, suitably connected to the longitudinal member 20 of the suppressor and extending diagonally beneath the suppressor to a large massive anchor member 82 resting on the water bottom 84. The anchor member 82 may be formed by a large mass of concrete, rock or other fixed anchoring means. As an alternative approach, the lower end of the anchor cable 82 may be attached to a main line or lead cable tightly stretched along the bottom between fixed anchoring points.

The suppressor longitudinal member 22 has an anchor cable 86 extending diagonally beneath the suppressor to another anchoring member 88. Thus, it can be seen that the anchor cables 80 and 86 cross beneath the suppressor, and the anchor member 82 is closer to the outer member 22 of the suppressor than it is to the outer member 20; and correspondingly, the anchor member 88 is closer to the suppressor longitudinal member 20 than it is to member 22. With such an arrangement, the drift of the suppressor can be adequately controlled but yet variations in the water height can be readily accommodated by increasing and relieving slack in the cables 80 and 86. With a 1,000 foot length of suppressor, it is preferable that pairs of anchor cables 80 and 86 be employed every two to three hundred feet, as indicated in FIG. 1.

In operation the suppressors are preferably positioned within the water with the outer longitudinal members arranged somewhat obliquely to the direction of travel of the waves to be suppressed. In most situations, this condition naturally occurs due to variations of the wind forming the waves causing the direction of wave travel to be similarly varied. Also, short-term wave action caused by large speedboats can, of course, come from many directions.

This typical situation is illustrated in FIGS. 8 and 9 wherein the suppressor 16 is situated at somewhat of an angle to the wave crests represented by the lines 95–99. For purposes of illustration, the waves are shown in dotted lines as if not interrupted or spoiled by the suppressor; but it should be understood that after encountering the suppressor, the waves no longer remain in their prior uniform fashion due to the suppression action of the suppressor.

Because of the substantial length of the suppressor, portions of it cross several wave peaks as schematically illustrated. Consequently, different sections of the suppressor are subjected to different forces at a given instant. In view of the rigidity of the structure, the suppressor tends to float in the water in a relatively stable position with a minimum of rolling with the waves, as indicated by FIG. 9 and the exemplary cross-sectional views of FIGS. 10–12. Note that with waves of sufficient size, portions of the suppressor may be submerged while other portions are completely out of the water. Due to the great structural strength of the concrete modules prestressed by the tension elements, the suppressor is able to withstand the bending moments and other stresses introduced by this action.

Adding to this stability is the substantial spacing between the longitudinal members of the suppressor. By selecting this distance to be less than one wave length of the waves to be suppressed and greater than one-half of such wave length, it is likely that the suppressor will bridge at least two wave crests as, shown in FIG. 8, with even a slight angle existing between the wave crests and the suppressor. With less spacing between the longitudinal members, there is of course greater likelihood that the suppressor will not bridge at least two wave crests if the angle between a wave and the longitudinal members of the suppressor is small, and hence the structure would be less stable. The suppressor longitudinal members may be spaced further than a wave length, however the structure then becomes more costly, more cumbersome, and strength problems increase.

In the relatively rare situation where the waves are traveling completely perpendicular to the suppressor longitudinal members so that a given wave crest encounters one entire longitudinal member of the suppressor at about the same time, the suppressor tends to move up and down with the wave, rather than being relatively vertically stable in the water. However, even in this situation it is desirable that the distance between the longitudinal members be less than one wave length of the waves to be suppressed and greater than one-half of such wave length. Although the suppressor tends to rock or roll somewhat with the wave the longitudinal members are subjected to different, and to some extent opposing, action at any given moment with the result that the wave spoiling ability is enhanced. Since the water at a particular phase of a wave is moving in essentially the same manner for each wave, it is desirable that the distance between the suppressor longitudinal members not be equal to the wave length in that such a suppressor although not tending to rock signficantly would tend to rise and fall with the water too readily for optimum suppression. If the longitudinal members are spaced less than a wave length, the unit would tend to roll too much when the direction of wave travel is completely perpendicular to the longtudinal members of the suppressor.

Although the lengths of the waves will normally constantly vary in a given location, the suppressor can nevertheless be constructed to most effectively control the waves contemplated to be most destructive. Information regarding wave heights and lengths is readily available for most areas; and if not, can be predicted with a fair degree of certainty through wave studies. The waves to be suppressed primarily are those formed by wind action, and hence are largely surface characteristics. Some of the factors affecting wave height and length are the velocity of the wind, the duration of the wind, direction of the wind, the greatest distance over which the wind can act, depth of the water and the nature of the water bottom.

The exact nature of the wave spoiling action of the suppressor is rather complex and is perhaps not completely understood. It is believed to include a combination of force interruption and liquid displacement action which suppresses the motion of the waves and causes energy losses within water. Although a wave form is a pulsating traveling phenomena continually moving in a given direction, the water forming the wave tends to remain in the same general area while rising and falling with the wave. It is believed that the water particles at the peak of the wave are generally moving in the direction that the wave is traveling, while the particles at the trough of the wave are generally moving in a direction opposite to that of the wave crests. That is, referring to FIG. 2, the water particles at crest 90 and 92 are moving toward the short 12, while the particles at the trough 94 are moving away from the shore. The water in front of an advancing crest is believed to be rising and the water behind the crest, falling.

As the advancing waves encounter the suppressor, the wave crest strikes the first longitudinal member of the suppressor and is forced to rise over the relatively stationary massive suppressor member as seen in FIG. 2. In effect, the longitudinal suppressor member displaces a portion of the water forming the wave and adds displacement to a wave crest which interrupts or trips the wave sequence. The portion of the wave continuing over the first longitudinal member of the suppressor is temporarily confined in the compartments 26 formed by the longitudinal and lateral members and a portion of the water rushes in to fill the space in the wave which was previously occupied by the suppressor longitudinal member. This action causes great turbulence within the water resulting in considerable shear frictional losses. The flow of water over the longitudinal member into the compartments is believed to change vertical motion into horizontal which adds to the wave destruction.

Since as previously explained, the wave strikes the suppressor at somewhat of an oblique angle, the portion of the wave continuing beyond the first longitudinal member also engages the lateral members of the suppressor at an angle. Therefore, the lateral members tend to straighten the wave and direct it towards the other longitudinal member which causes additional turbulence and energy losses within the water. Also the displacement effect of the lateral members adds to the wave spoiling action. The portion of the wave then continuing is tripped or interrupted by the second longitudinal member of the suppressor to further spoil the wave form.

Thus, it will be appreciated that the invention provides a relatively low cost means for effectively suppressing waves.

What is claimed is:

1. A floatable wave suppressor adapted to be anchored in large bodies of water in the path of incoming waves comprising:

a plurality of massive, widely spaced, longitudinal members extending in length a substantial distance;

a plurality of lateral members rigidly connecting said longitudinal members and defining large compartments between the members, which are open at the top and bottom, said lateral and longitudinal members each having a concrete exterior shell and a lightweight core so that the suppressor will float on water with a substantial portion of the members extending above the water to interrupt waves;

said members being formed of a plurality of monolithic modules with each module including one of said lateral members and a portion of at least one of said longitudinal member; and tension means for rigidly connecting said portions of the longitudinal members in adjacent aligned relationship.

2. The suppressor of claim 1 wherein each of said modules has a generally I-shape with a central section and a pair of spaced outer sections integrally formed on the ends of the central section, and said connecting means join said modules in side-by-side relation with the ends of their outer sections aligned so that the outer sections form said spaced longitudinal members of the suppressor joined by lateral members formed by the central sections of the modules.

3. The suppressor of claim 2 wherein said module outer sections are about eight feet in length.

4. The suppressor of claim 2 including a layer of wire mesh embedded in the walls of said shell.

5. The suppressor of claim 2 including a plurality of reinforcing members spaced throughout said modules extending between opposite side walls of said shell with the ends of the members being embedded in the concrete.

6. The suppressor of claim 2 wherein said module sections have a cross-section about 3 feet high by 18 inches in width, a plurality of reinforcing members spaced throughout said modules extending between opposite side walls of said shell with the ends of the reinforcing members being embedded in the concrete; and said connecting means comprises a pair of metal pipes embedded in enlarged portions in the upper and lower walls of said concrete shell in each of the outer sections of the modules and extending parallel to said outer sections, a socket formed in each of said outer section ends with each pipe end opening into a socket, a tie rod extending through each of said pipes having threaded ends beyond the ends of said pipes into said sockets, a threaded tension nut received in each socket for threading on said rods with one end of the nut receiving an end of one rod and the other end receiving the end of a rod from an adjacent module, and a flat elongated gasket surrounding said nut and positioned between the ends of the outer sections of adjacent modules.

7. The suppressor of claim 1 wherein said tension connecting means comprises a pair of metal pipes embedded in enlarged portions in the upper and lower walls of said concrete shell in the sections of said modules forming portions of said longitudinal members, a tie rod extending through each of said pipes having threaded ends extending beyond the ends of the pipes, and an elongated threaded tension nut partially threaded on the end of each rod with the other end of the nut threaded onto the end of a rod from an adjacent module.

8. The suppressor of claim 7 including a flat gasket surrounding said nut and positioned between the mating ends of the adjacent modules.

9. The suppressor of claim 1 including anchoring means comprising two or more pairs of anchoring cables spaced along the length of the suppressor, each pair having a cable with one end attached to one of said longitudinal members and the other end attached to anchoring means on the water bottom located at a point which is closer to the other longitudinal member of the suppressor than said one member, and a cable connecting said other longitudinal member to an anchoring means on the water bottom located at a point which is closer to said one longitudinal member than to said other longitudinal member.

References Cited

UNITED STATES PATENTS

| | | | |
|---|---|---|---|
| 436,644 | 9/1890 | White | 61—5 |
| 1,004,718 | 10/1911 | Wieland | 61—5 |
| 1,184,149 | 5/1916 | Thorne | 61—5 |
| 1,733,790 | 10/1929 | Gilman | 61—47 |
| 1,909,539 | 5/1933 | Huntoon | 61—47 |
| 2,658,350 | 11/1953 | Magill | 61—5 |
| 2,994,201 | 8/1961 | Hutchings | 61—5 |
| 3,091,203 | 5/1963 | Usab | 61—48 X |
| 3,276,209 | 10/1966 | Mosdell | 61—5 |
| 3,306,053 | 2/1967 | Fulton | 61—48 |

EARL J. WITMER, Primary Examiner